United States Patent
Chen et al.

(10) Patent No.: US 12,124,293 B2
(45) Date of Patent: Oct. 22, 2024

(54) ELECTRONIC DEVICE

(71) Applicant: ASUSTEK COMPUTER INC., Taipei (TW)

(72) Inventors: Yung-Hsiang Chen, Taipei (TW); Li-Wei Hung, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 340 days.

(21) Appl. No.: 17/677,463

(22) Filed: Feb. 22, 2022

(65) Prior Publication Data
US 2022/0326732 A1    Oct. 13, 2022

(30) Foreign Application Priority Data
Apr. 8, 2021   (TW) .................. 110112631

(51) Int. Cl.
*G06F 1/16*   (2006.01)
*G06F 1/20*   (2006.01)

(52) U.S. Cl.
CPC .......... *G06F 1/1616* (2013.01); *G06F 1/1675* (2013.01); *G06F 1/203* (2013.01)

(58) Field of Classification Search
None
See application file for complete search history.

(56) References Cited

U.S. PATENT DOCUMENTS

| | | | | |
|---|---|---|---|---|
| 5,534,891 A * | 7/1996 | Takano | ............ | G06F 1/1666 345/169 |
| 7,630,195 B2 * | 12/2009 | Lin | ............ | G06F 1/203 361/679.26 |
| 11,726,531 B2 * | 8/2023 | Tsai | ............ | G06F 1/1616 361/679.27 |
| 2019/0317561 A1 | 10/2019 | Chang et al. | | |
| 2020/0183451 A1 * | 6/2020 | Lin | ............ | G06F 1/1666 |

FOREIGN PATENT DOCUMENTS

| | | |
|---|---|---|
| CN | 102541223 A | 7/2012 |
| CN | 101813961 B | 8/2012 |
| CN | 111665904 A | 9/2020 |
| JP | H0660036 A | 3/1994 |
| JP | 2005173857 A | 6/2005 |
| TW | M434967 | 8/2012 |
| TW | M575139 U | 3/2019 |
| TW | M595380 | 5/2020 |

\* cited by examiner

*Primary Examiner* — Anthony Q Edwards
*Assistant Examiner* — Rashen E Morrison
(74) *Attorney, Agent, or Firm* — Muncy, Geissler, Olds & Lowe, P.C.

(57) ABSTRACT

An electronic device is provided. The electronic device includes a first body with a base and a movable member, a second body, a lifting member, and a linkage mechanism. The movable member is located on an upper surface of the base and includes a first side and a second side. The first side is pivotally connected to the base. The second body is pivotally connected to the second side by using a first rotary shaft. The lifting member is pivotally connected to the movable member by using a second rotary shaft. The linkage mechanism is disposed on the movable member, is linked to the second body by using the first rotary shaft, and drives the lifting member to rotate by using the second rotary shaft. When the second body is opened upward, an air outlet on a rear side of the first body is prevented from being covered.

10 Claims, 8 Drawing Sheets

ELECTRONIC DEVICE

CROSS-REFERENCE TO RELATED APPLICATION

This application claims the priority benefit of Taiwan application serial No. 110112631, filed on Apr. 8, 2021. The entirety of the above-mentioned patent application is hereby incorporated by reference herein and made a part of the specification.

BACKGROUND OF THE INVENTION

Field of the Invention

The disclosure relates to an electronic device, and in particular, to an electronic device including a rotary shaft.

Description of the Related Art

For a case of a conventional notebook computer, an air outlet is mostly disposed on a rear side of the case to dissipate heat. However, when a screen is opened, a lower edge of the screen is likely to cover the air outlet, affecting heat dissipation efficiency. In addition, hot air discharged from the air outlet is directly blown to a panel of the screen, easily causing damage to the panel due to an excessively high temperature.

BRIEF SUMMARY OF THE DISCLOSURE

The disclosure provides an electronic device. The electronic device includes a first body, a second body, a lifting member, and a linkage mechanism. The first body includes a base and a movable member. The movable member is located on an upper surface of the base and includes a first side and a second side. The first side is pivotally connected to the base. The second body is pivotally connected to the second side by using a first rotary shaft.

The lifting member is pivotally connected to the movable member by using a second rotary shaft. The linkage mechanism is disposed on the movable member and includes a first gear, a second gear, and a third gear. The first gear is fixed to the first rotary shaft and is engaged with the second gear, the second gear is engaged with the third gear, and the third gear is fixed to the second rotary shaft. The linkage mechanism is linked to the second body by using the first rotary shaft, to drive the lifting member to rotate.

According to the electronic device of the disclosure, when the second body is opened upward relative to the first body, it is prevented that the second body covering an air outlet located on a rear side of the base of the first body, to ensure heat dissipation efficiency of the electronic device.

DETAILED DESCRIPTION OF THE EMBODIMENTS

More detailed descriptions of specific embodiments of the disclosure are provided below with reference to the schematic diagrams. The advantages and features of the disclosure are described more clearly according to the following description and claims. It is to be noted that all of the accompanying drawings use very simplified forms and imprecise scales, which are only used for assisting in conveniently and clearly illustrating the objective of the embodiments of the disclosure.

Figure 1:
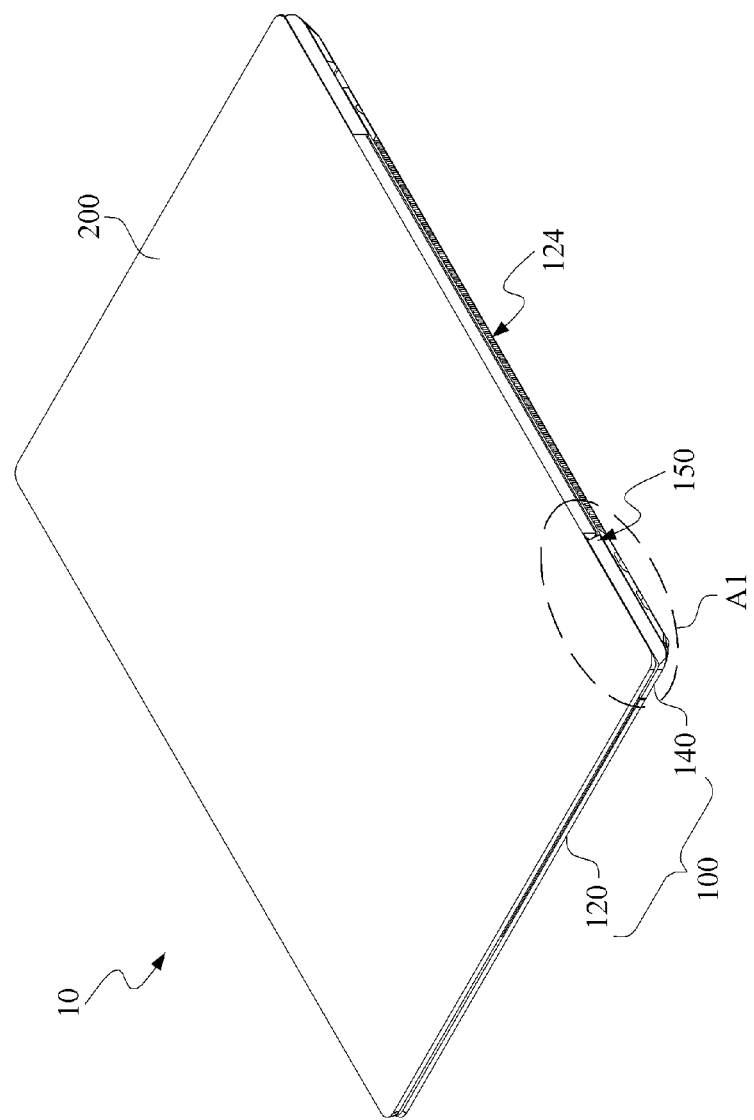
FIG. 1 and FIG. 2 are schematic three-dimensional diagrams of an electronic device in a closed state and an open state according to a first embodiment of the disclosure.
Figure 2:
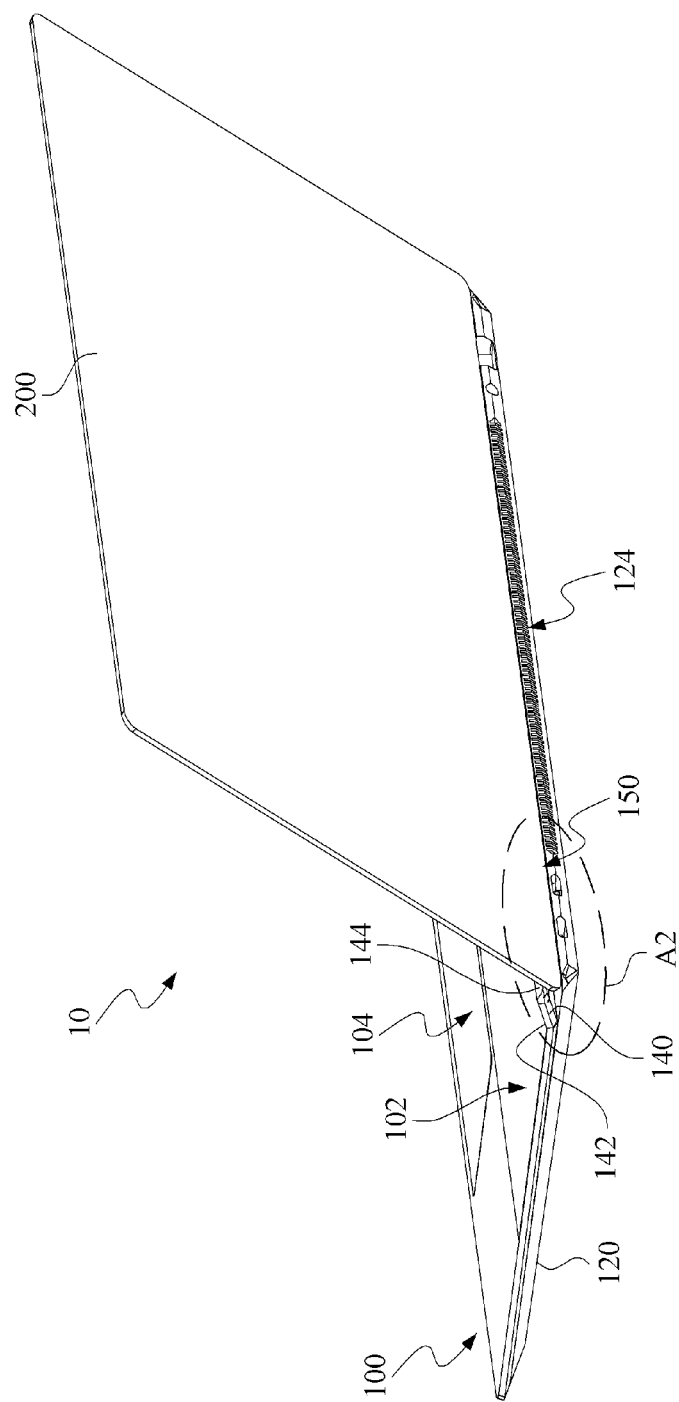

FIG. 1 and FIG. 2 are schematic three-dimensional diagrams of an electronic device in a closed state and an open state according to a first embodiment of the disclosure. FIG. 1 shows that the electronic device is in the closed state. FIG. 2 shows that the electronic device is in the open state.

As shown in FIG. 1 and FIG. 2, an electronic device 10 of the disclosure includes a first body 100 and a second body 200. The first body 100 includes a base 120 and a movable member 140. The movable member 140 is located on an upper surface of the base 120 and includes a first side 142 and a second side 144. The first side 142 of the movable member 140 is pivotally connected to the base 120. The second side 144 of the movable member 140 is pivotally connected to the second body 200 by using a first rotary shaft 150. The base 120 includes an air outlet 124. The air outlet 124 is located on a side surface of the base 120 adjacent to the movable member 140, i.e., a rear side surface of the base 120.

In an embodiment, the movable member 140 includes an output/input unit, such as a speaker, a screen or a touchpad, to expand functions of the electronic device 10.

Figure 3:
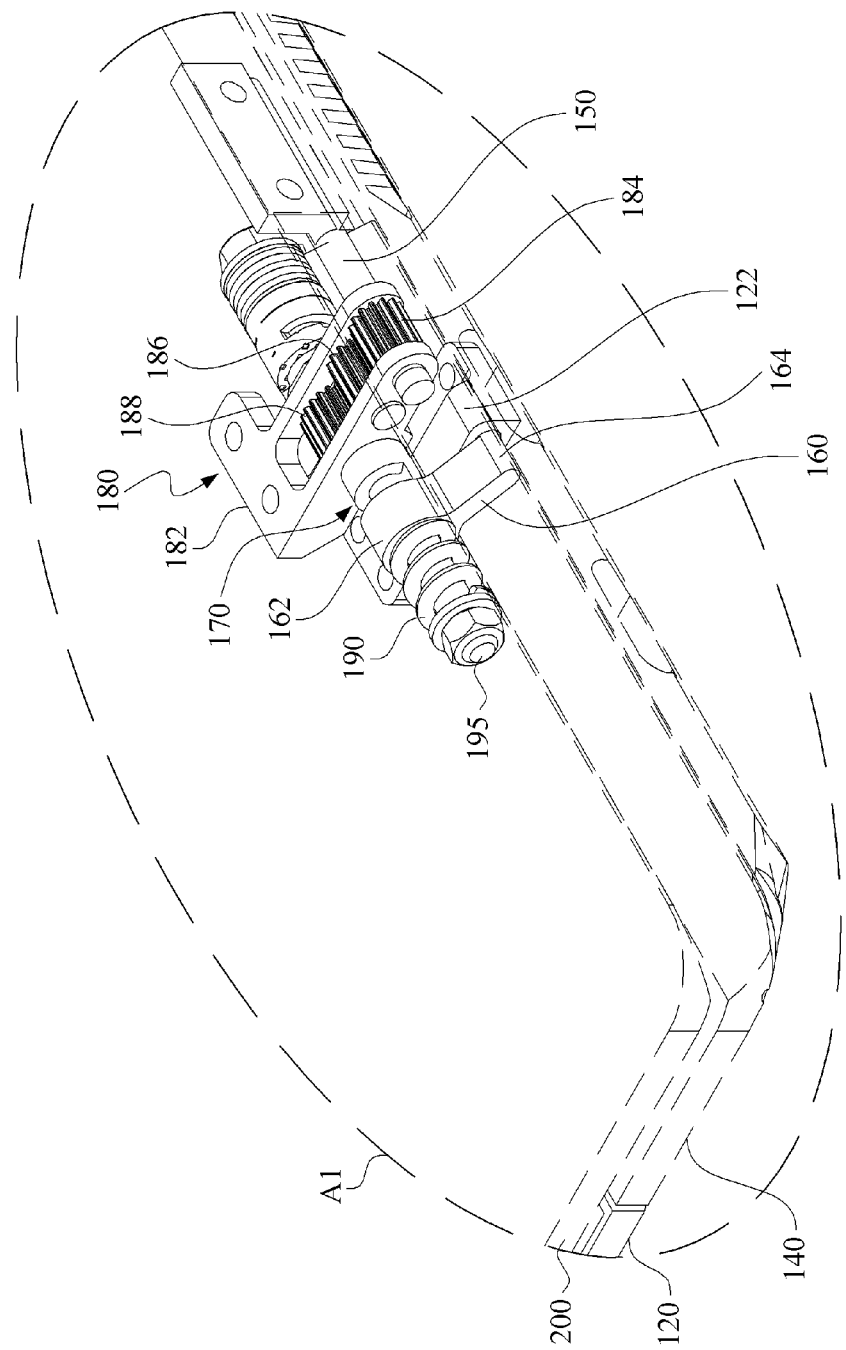
FIG. 3 is an enlarged schematic perspective view of a region A1 in FIG. 1.
Figure 4:
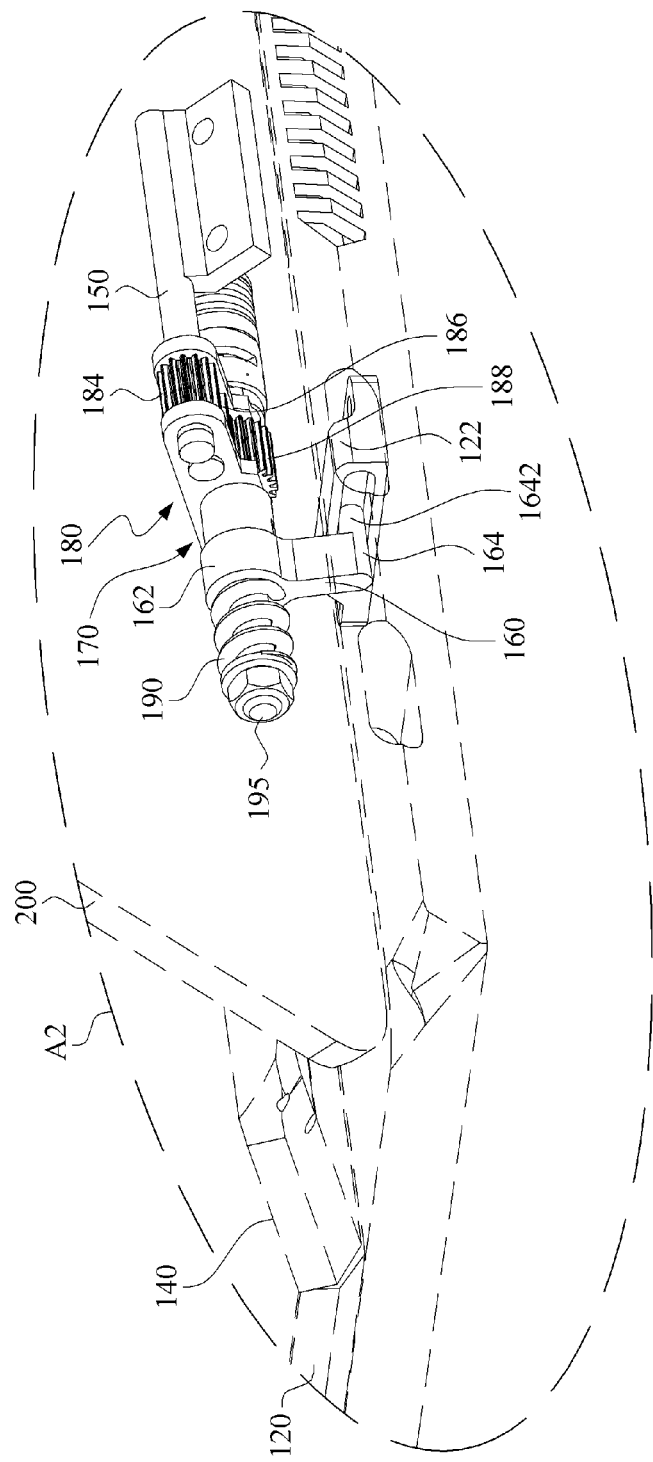
FIG. 4 is an enlarged schematic perspective view of a region A2 in FIG. 2.

Referring to FIG. 3 and FIG. 4 together, FIG. 3 is an enlarged schematic perspective view of a region A1 in FIG. 1, and FIG. 4 is an enlarged schematic perspective view of a region A2 in FIG. 2.

As shown in FIG. 3 and FIG. 4, the upper surface of the base 120 includes a slide rail 122. The electronic device 10 further includes a lifting member 160 and a linkage mechanism 180, to enable the movable member 140 to be linked to the second body 200.

The lifting member 160 is pivotally connected to the movable member 140 by using a second rotary shaft 170. The lifting member 160 includes a pivot end 162 and a movable end 164. The pivot end 162 is pivotally connected to the movable member 140. The movable end 164 includes a bump 1642 to be slidably fitted into the slide rail 122. In an embodiment, the pivot end 162 and the movable end 164 are located at two opposite ends of the lifting member 160.

The linkage mechanism 180 is disposed on the movable member 140 and is linked between the first rotary shaft 150 and the second rotary shaft 170. The linkage mechanism 180 includes a gear seat 182, a first gear 184, a second gear 186, and a third gear 188. The first gear 184, the second gear 186, and the third gear 188 are disposed on the gear seat 182. The first gear 184 is fixed to the first rotary shaft 150 and is engaged with the second gear 186, the second gear 186 is engaged with the third gear 188, and the third gear 188 is fixed to the second rotary shaft 170.

In an embodiment, as shown in the figures, the gear seat 182 is disposed on a lower surface of the movable member 140. The linkage mechanism 180 is linked to the second body 200 by using the first rotary shaft 150 and drives the lifting member 160 to rotate by using the second rotary shaft 170, to further lift the movable member 140 and the second body 200.

When the second body 200 is opened upward relative to the movable member 140 by using the first rotary shaft 150, the first rotary shaft 150 together with the first gear 184 fixed to the first rotary shaft is driven to rotate. The rotation of the first gear 184 is transmitted to the third gear 188 by using the second gear 186, so that the second rotary shaft 170 is driven to rotate. Then the lifting member 160 is driven to rotate by using the second rotary shaft 170, so that the lifting member 160 rotates from a position shown in FIG. 3 to a position shown in FIG. 4.

In this embodiment, the linkage mechanism 180 performs transmission by using three gears (that is, the first gear 184, the second gear 186, and the third gear 188), so that a rotation direction of the lifting member 160 is the same as a rotation direction of the second body 200 relative to the first body 100. In other embodiments, the rotation direction of the lifting member 160 is opposite to the rotation direction of the second body 200, and the movable member 140 and the second body 200 are also lifted.

According to actual design requirements, a gear ratio of the gears in the linkage mechanism 180 is adjusted to change a rotation angle of the lifting member 160 relative to the second body 200. In an embodiment, if a quantity of teeth of the first gear 184 is twice a quantity of teeth of the third gear 188, 90-degree rotation of the second body 200 only drives the third gear 188 to rotate by 45 degrees.

Figure 5:
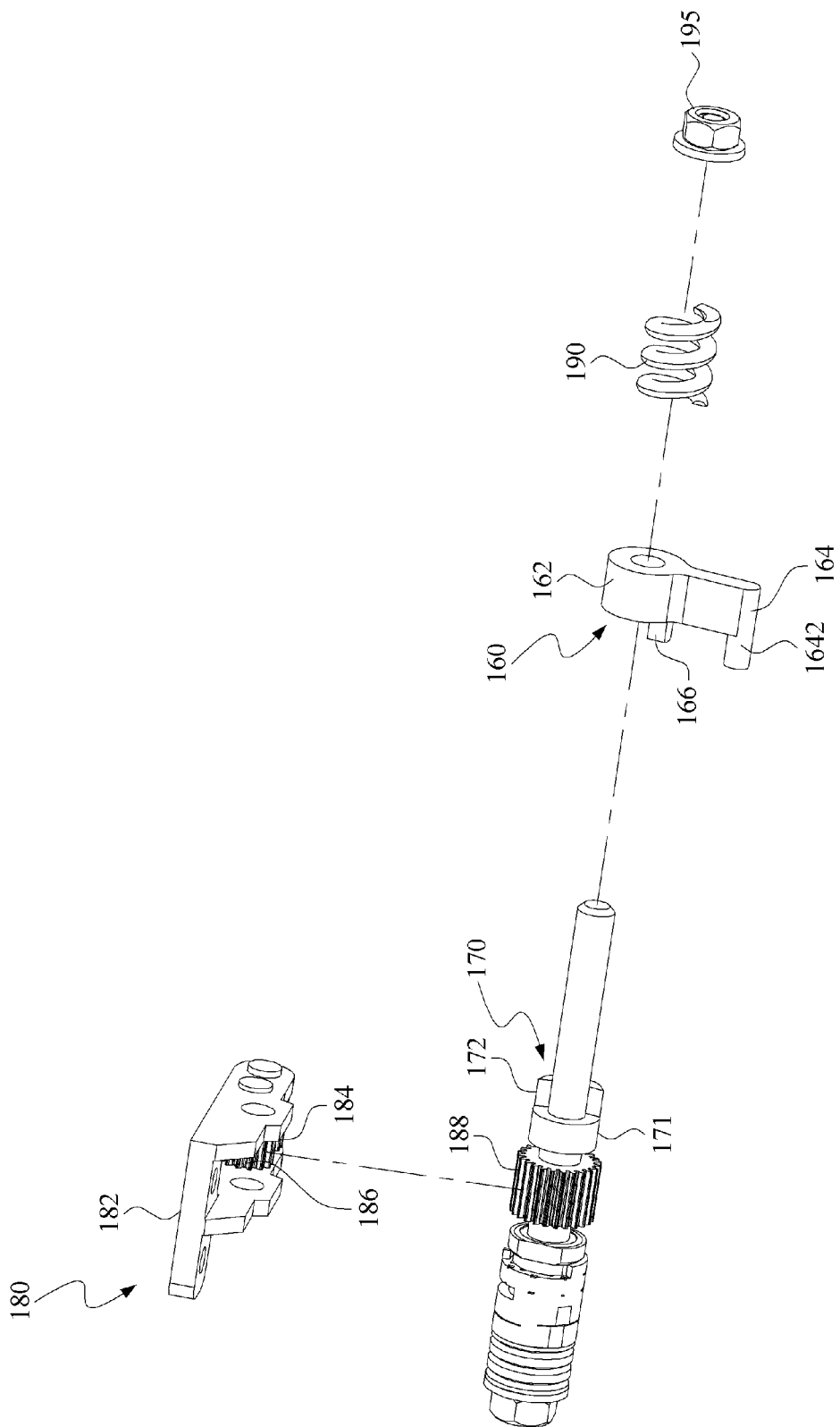
FIG. 5 is an exploded view showing a connection relationship between a lifting member and a second rotary shaft.

Referring to FIG. 5, FIG. 5 is an exploded view showing a connection relationship between a lifting member 160 and a second rotary shaft 170. As shown in FIG. 5, the second rotary shaft 170 includes a transmission portion 171 to drive the lifting member 160. The transmission portion 171 includes a first bump 172 located on a side facing the lifting member 160. Corresponding to the first bump 172, the lifting member 160 includes a second bump 166 located on a side facing the transmission portion 171.

In this way, the rotation of the second rotary shaft 170 is transmitted to the lifting member 160 by using the first bump 172 and the second bump 166, to enable the lifting member 160 to rotate. By changing a position for disposing the first bump 172 or the second bump 166, a timing for the lifting member 160 to rotate to lift the movable member 140 and the second body 200 is adjusted. In an embodiment, it is set that only after the second body 200 is opened upward by 45 degrees, the first bump 172 abuts against the second bump 166 to enable the lifting member 160 to rotate to lift the movable member 140 and the second body 200.

As shown in FIG. 5, the electronic device 10 in this embodiment further includes a torsion device 190. The torsion device 190 is disposed on the second rotary shaft 170 to increase friction resistance between the lifting member 160 and the second rotary shaft 170. One side of the torsion device 190 abuts against the lifting member 160, and the other side is fixed by using a locking member 195. The torsion device 190 applies a force to the lifting member 160 in an axial direction of the second rotary shaft 170, to increase the friction resistance between the lifting member 160 and the second rotary shaft 170. In this way, the lifting member 160 and the second body 200 are supported at a required angle position. In an embodiment, the torsion device 190 is a compression spring.

Figure 6:
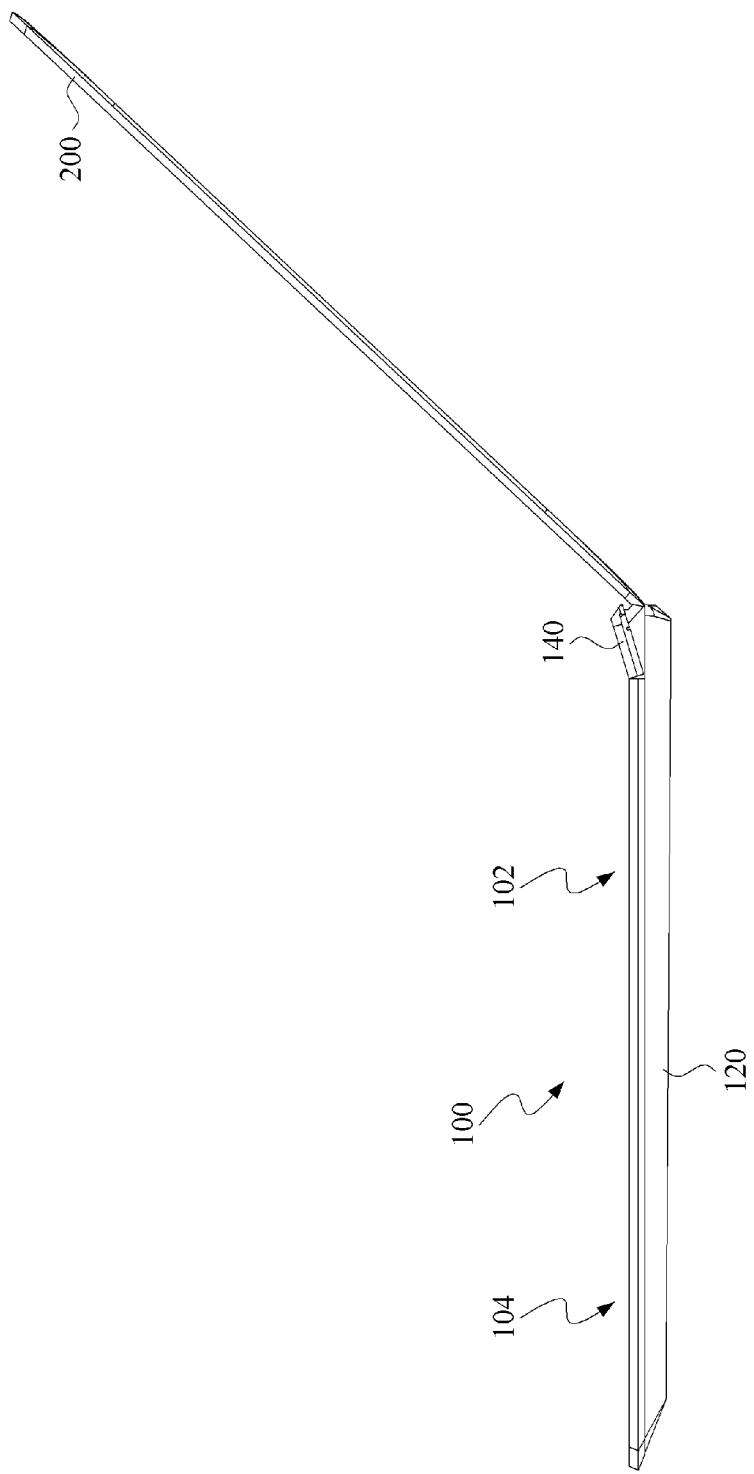
FIG. 6 is a schematic side view of an electronic device according to a second embodiment of the disclosure.

FIG. 6 is a schematic side view of an electronic device according to a second embodiment of the disclosure. Referring to FIG. 6, in the second embodiment, the movable member 140 is located on an elongated structure between a keyboard region 102 of the first body 100 and the second body 200. The keyboard region 102 and a touch region 104 are located on the base 120 of the first body 100.

Figure 7:
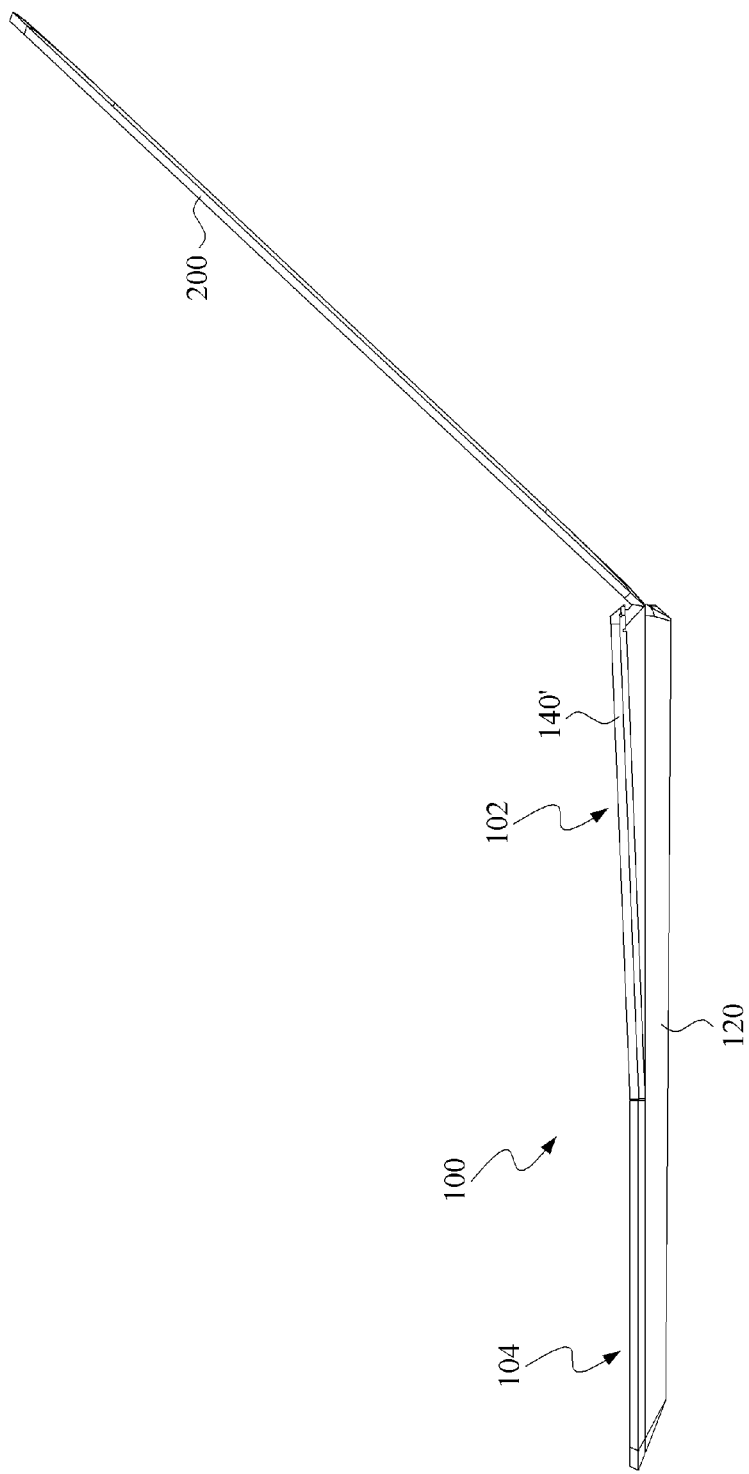
FIG. 7 is a schematic side view of an electronic device according to a third embodiment of the disclosure.
Figure 8:
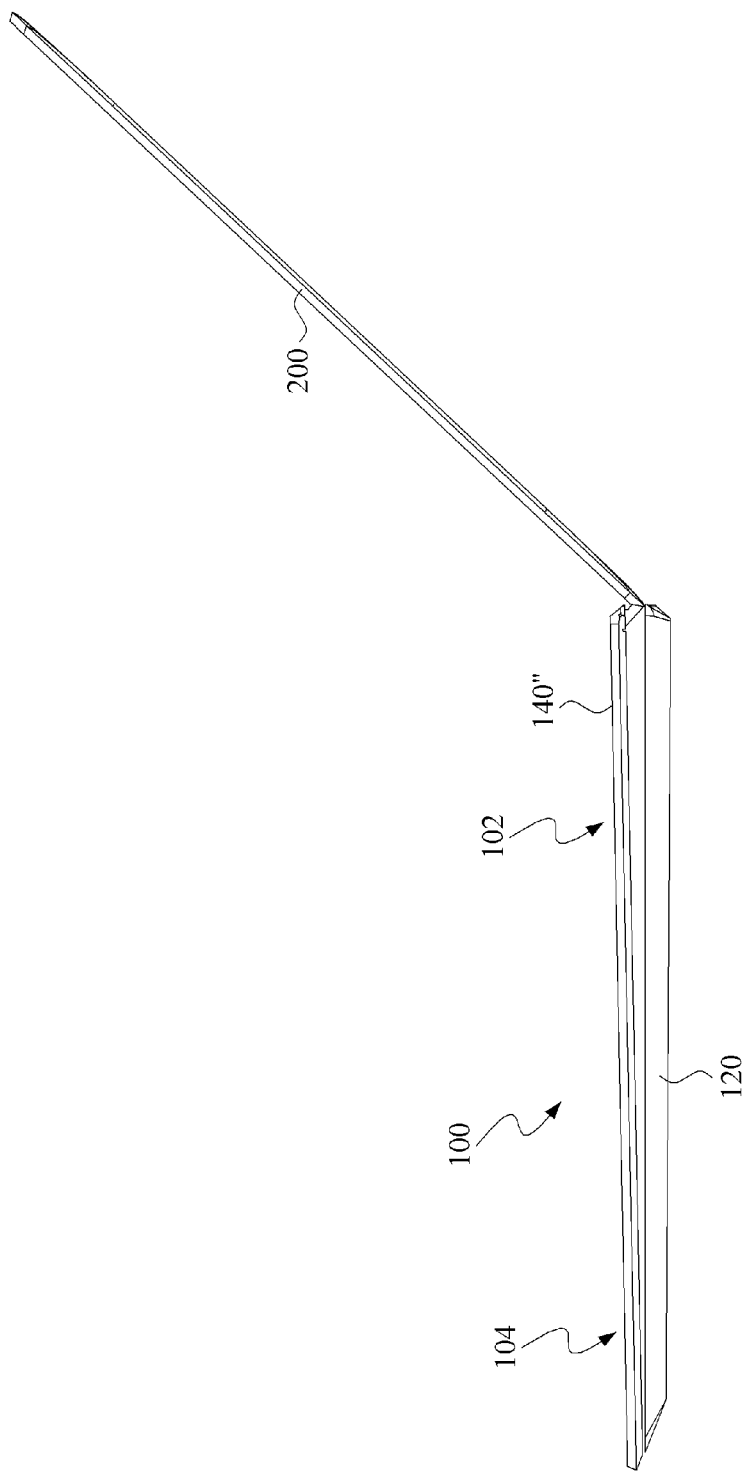
FIG. 8 is a schematic side view of an electronic device according to a fourth embodiment of the disclosure.

Referring to FIG. 7 and FIG. 8, FIG. 7 is a schematic side view of an electronic device according to a third embodiment of the disclosure. FIG. 8 is a schematic side view of an electronic device according to a fourth embodiment of the disclosure. In the embodiment of FIG. 7, the keyboard region 102 is located on a movable member 140' and is lifted along with the movable member 140', to improve operating comfort of a user. In the embodiment of FIG. 8, an upper portion of the entire first body 100 including the keyboard region 102 and the touch region 104 is all lifted along with a movable member 140", to improve the operating comfort of the user.

According to the electronic device 10 of the disclosure, when the second body (in an embodiment, a screen) is opened upward relative to the first body (in an embodiment, a case), it is prevented that the second body covering an air outlet located on a rear side of the base of the first body, to ensure heat dissipation efficiency of the electronic device.

In an embodiment, the first body 100 further includes an air inlet (not shown) located at a position on the upper surface of the base 120 corresponding to the movable member 140. When the electronic device 10 is in the closed state, the movable member 140 is closed on the base 120 and covers the air inlet on the upper surface of the base 120, to prevent external dust from entering. When the second body 200 is opened upward, the movable member 140 is lifted, and an air inlet passage is formed between the base 120 and the movable member 140, so that airflow enters the air inlet on the upper surface of the base 120 through the air inlet passage, thereby improving a heat dissipation effect.

In addition, in the disclosure, the movable member lifted upward along with the second body lifts the keyboard region or the touch region, to improve the operating comfort of the user. In addition, another output/input unit, such as a speaker, a screen, or a touchpad, is disposed on the movable member, to expand functions of the electronic device and meet requirements of the user.

Although the disclosure is described with reference to the above embodiments, the embodiments are not intended to limit the disclosure. A person skilled in the art makes modifications and improvements without departing from the spirit and scope of the disclosure. Therefore, the protection scope of the disclosure is subject to the claims.

What is claimed is:

1. An electronic device, comprising:
  a first body, comprising a base and a movable member, wherein the movable member is located on an upper surface of the base and comprises a first side and a second side, and the first side is pivotally connected to the base;
  a second body, pivotally connected to the second side by using a first rotary shaft;
  a lifting member, pivotally connected to the movable member by using a second rotary shaft; and
  a linkage mechanism, disposed on the movable member, and comprising:
    a first gear, fixed to the first rotary shaft;
    a second gear, engaged with the first gear; and
    a third gear, engaged with the second gear and fixed to the second rotary shaft;

wherein, the linkage mechanism is linked to the second body by using the first rotary shaft, to drive the lifting member to rotate, and wherein a rotation axis of the second gear is parallel to that of the first rotary shaft.

2. The electronic device according to claim 1, wherein the movable member comprises an output/input unit.

3. The electronic device according to claim 2, wherein the output/input unit is a screen.

4. The electronic device according to claim 2, wherein the output/input unit is a speaker.

5. The electronic device according to claim 1, wherein the base comprises an air outlet located on a side surface of the base adjacent to the movable member.

6. The electronic device according to claim 1, wherein the base comprises an air inlet located on the upper surface.

7. The electronic device according to claim 1, further comprising a torsion device, disposed on the second rotary shaft, to provide resistance to the lifting member.

8. The electronic device according to claim 1, wherein the second rotary shaft comprises a bump configured to drive the lifting member to rotate.

9. The electronic device according to claim 1, further comprising a slide rail disposed on the upper surface, wherein the lifting member comprises a pivot end and a movable end, the pivot end is pivotally connected to the movable member, and the movable end comprises a bump configured to be slidably fitted into the slide rail.

10. The electronic device according to claim 1, further comprising a gear seat disposed on a lower surface of the movable member, wherein the first gear, the second gear, and the third gear are disposed on the gear seat.

* * * * *